United States Patent
Kuzuyama

(10) Patent No.: US 7,818,112 B2
(45) Date of Patent: Oct. 19, 2010

(54) HOMOGENEOUS CHARGE COMPRESSION IGNITION ENGINE

(75) Inventor: Hiroshi Kuzuyama, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 112 days.

(21) Appl. No.: 12/288,117

(22) Filed: Oct. 15, 2008

(65) Prior Publication Data

US 2009/0125213 A1    May 14, 2009

(30) Foreign Application Priority Data

Oct. 16, 2007    (JP)    ............... 2007-269413

(51) Int. Cl.
F02B 47/08    (2006.01)
F02M 25/07    (2006.01)
(52) U.S. Cl. .................. 701/103; 123/295; 123/568.11; 123/568.14; 123/568.21
(58) Field of Classification Search .................. 123/295, 123/568.11, 568.14, 568.21; 701/103
See application file for complete search history.

(56) References Cited

U.S. PATENT DOCUMENTS 7,274,986 B1 * 9/2007 Petridis et al. ............... 701/102
7,275,514 B2 * 10/2007 Kuo et al. .................... 123/299
2006/0016423 A1 * 1/2006 Kuo et al. .................... 123/299
2006/0243241 A1 * 11/2006 Kuo et al. .................... 123/295

FOREIGN PATENT DOCUMENTS

JP    2004-204745    7/2004
JP    2007-162527    6/2007

* cited by examiner

*Primary Examiner*—Erick Solis
(74) *Attorney, Agent, or Firm*—Locke Lord Bissell & Liddell LLP

(57) ABSTRACT

An HCCI engine operated in HCCI and SI combustion modes. The engine includes an external EGR apparatus for performing external EGR. A control unit executes combustion control by specifying either one of HCCI and SI combustion ranges based on the driving state of the engine and a combustion range map for specifying the combustion range in accordance with the driving state. The map includes the HCCI and SI combustion ranges and a switch preparation combustion range, which is included in the SI combustion range and extends along a boundary between the SI combustion range and the HCCI combustion range. The control unit lowers the temperature in the combustion chamber when the switch preparation combustion range is specified by reducing the amount of internal EGR or performing the external EGR.

7 Claims, 7 Drawing Sheets

HOMOGENEOUS CHARGE COMPRESSION IGNITION ENGINE

BACKGROUND OF THE INVENTION

The present invention relates to a homogeneous charge compression ignition engine that is switchable between homogeneous charge compression ignition and spark ignition combustion.

Japanese Laid-Open Patent Publication Nos. 2004-204745 and 2007-162527 describe examples of homogeneous charge compression ignition (HCCI) engines. The HCCI engine is advantageous in that is generates only a small amount of NOx and practically no soot. However, an HCCI engine may not be able to perform homogeneous charge compression ignition combustion depending on the driving state of the engine. Thus, as described in the above publications, an HCCI engine executes switching control to switch combustion modes when necessary between homogeneous charge compression ignition combustion and spark ignition combustion.

The engine includes a combustion chamber, the temperature of which changes depending on whether the engine is performing homogeneous charge compression ignition combustion or flame propagation combustion caused by spark ignition. The temperature in the combustion chamber is higher in spark ignition combustion than in homogeneous charge compression ignition combustion. When switching from spark ignition combustion, in which the wall surface temperature of the combustion chamber is higher, to homogenous charge compression ignition combustion, ignition may occur at an abnormally advanced timing. Further, engine knocking may occur.

Japanese Laid-Open Patent Publication No. 2004-204745 describes an engine controller that lowers the temperature in the combustion chamber by, for example, opening an exhaust valve for a longer period, opening the exhaust valve twice, or drawing the exhaust gas discharged to an exhaust passage back into the combustion chamber.

However, the engine controller described in Japanese Laid-Open Patent Publication No. 2004-204745 executes control that lowers the temperature in the combustion chamber when switching from spark ignition combustion to homogeneous charge compression ignition combustion. Such control would not immediately lower the wall surface temperature of the combustion chamber and thus does not effectively prevent abnormally advanced ignition and engine knocking.

SUMMARY OF THE INVENTION

It is an object of the present invention to provide a homogeneous charge compression ignition engine that shifts to homogeneous charge compression ignition combustion in an optimum manner when switched from spark ignition combustion to homogeneous charge compression ignition combustion.

One aspect of the present invention is a homogeneous charge compression ignition engine operated in combustion modes switchable between homogeneous charge compression ignition combustion and spark ignition combustion. The engine includes a combustion chamber, an intake passage through which flows fresh air that is drawn into the combustion chamber, and an exhaust passage through which flows exhaust gas that is discharged from the combustion chamber. An external exhaust gas recirculation apparatus performs external exhaust gas recirculation by supplying the intake passage with some of the exhaust gas discharged to the exhaust passage and mixing the exhaust gas supplied to the intake passage with fresh air. A driving state detection unit which detects a driving state of the engine. A control unit executes combustion control by specifying either one of a homogeneous charge compression ignition combustion range and a spark ignition combustion range based on the driving state of the engine detected by the driving state detection unit and a combustion range map for specifying the combustion range that is in accordance with the driving state. The combustion range map includes the homogeneous charge compression ignition combustion range, the spark ignition combustion range, and a switch preparation combustion range that is included in the spark ignition combustion range and extended along a boundary between the spark ignition range and the homogeneous charge compression ignition combustion range. The control unit lowers the temperature in the combustion chamber when the switch preparation combustion range is specified by executing a control for reducing the amount of internal exhaust gas recirculation or having the external exhaust gas recirculation apparatus perform the external exhaust gas recirculation.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of an automobile engine according to the present invention will now be discussed with reference to FIGS. 1A to 4.

Figure 1A:
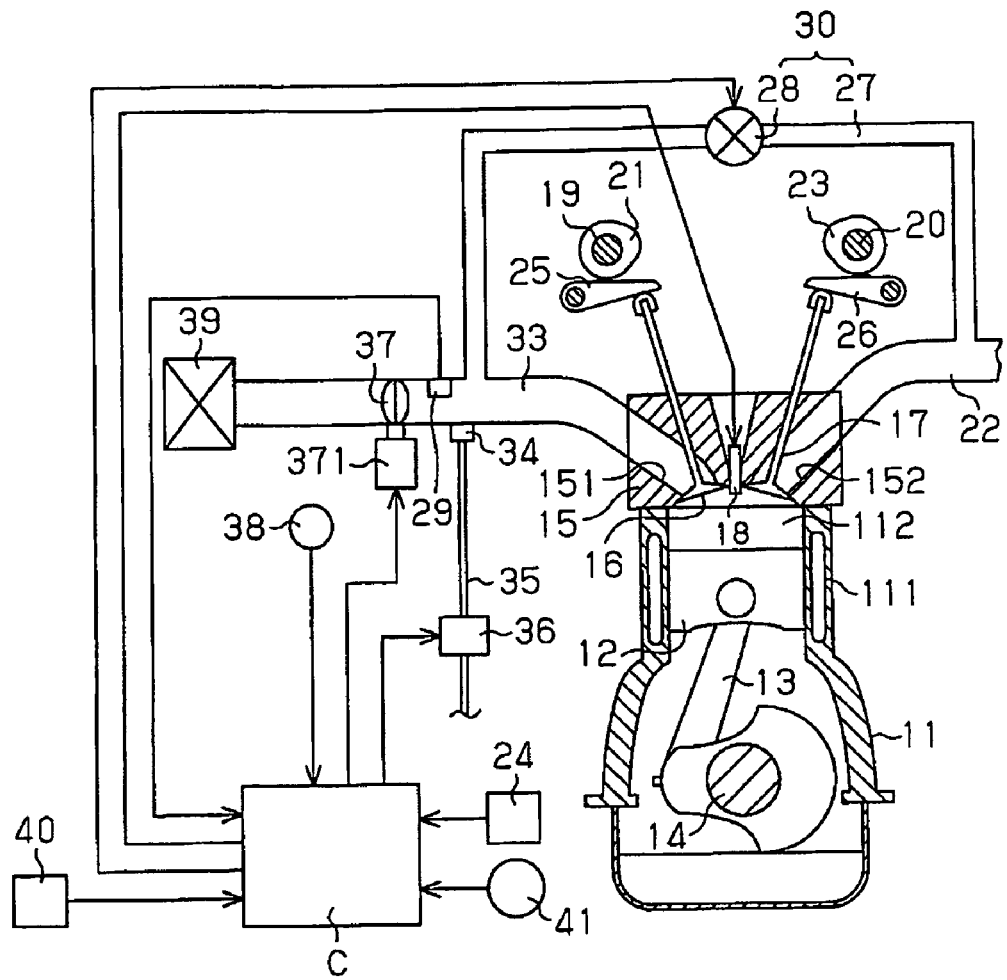
FIG. 1A is a schematic diagram showing the structure of a first embodiment of an HCCI engine according to the present invention.

As shown in FIG. 1A, a cylinder block 11 includes a plurality of cylinders 111 (only one shown). A piston 12 reciprocates in each cylinder 111. The piston 12 defines a combustion chamber 112 in the cylinder 111. The piston 12 is connected to a crankshaft 14 by a connecting rod 13. Reciprocation of the piston 12 is converted to rotation of the crankshaft 14 by the connecting rod 13. Although a plurality of the cylinders 111 are arranged in series in the axial direction of the crankshaft 14, only one will be described hereafter.

A cylinder head 15 is mounted on the cylinder block 11. The cylinder head 15 includes an intake port 151 and an exhaust port 152. An intake valve 16, which is arranged on the cylinder head 15, opens and closes the intake port 151. An exhaust valve 17, which is arranged on the cylinder head 15, opens and closes the exhaust port 152. An exhaust passage 22 is connected to the exhaust port 152.

A spark plug 18 is arranged in the cylinder head 15 facing toward the combustion chamber 112. The spark plug 18 generates sparks for ignition in the combustion chamber 112. A control computer C controls the ignition of the spark plug 18.

An intake camshaft 19 and an exhaust camshaft 20 are arranged above the cylinder head 15. The intake camshaft 19 includes an intake cam 21, and the exhaust camshaft 20 includes an exhaust cam 23. The intake cam 21 drives an intake cam lever 25, and the exhaust cam 23 drives an exhaust cam lever 26.

An injection nozzle 34 is connected to an intake passage 33, which is connected to the intake ports 151. The injection nozzle 34 is connected to a fuel supply (not shown) by a fuel supply passage 35 (and when necessary an electromagnetic flow amount control valve 36). The injection nozzle 34 injects fuel into the intake passage 33. The control computer C controls the flow amount control valve 36.

A throttle valve 37 is arranged in the intake passage 33 upstream from the injection nozzle 34. The open degree of the throttle valve 37 is changed by an electric motor 371. The electric motor 371 is controlled by the control computer C. The throttle valve 37 limits the amount of air drawn via an air cleaner 39 into the intake passage 33. That is, the throttle valve 37 regulates the intake amount. Fuel injected from the injection nozzle 34 mixes with the air drawn into the intake passage 33. The air-fuel mixture is drawn into the combustion chamber 112 when the intake port 151 opens as the piston 12 moves from the top dead center to the bottom dead center and. The air-fuel mixture drawn into the combustion chamber 112 is compressed when the exhaust port 152 is closed as the piston 12 moves from the bottom dead center to the top dead center.

The open degree of the throttle valve 37 is detected by a throttle opening detector 38. Information on the throttle open degree detected by the throttle opening detector 38 is transmitted to the control computer C.

The intake passage 33 and the exhaust passage 22 are connected to each other via a supply passage 27. An electromagnetic airflow adjustment valve 28 is arranged on the supply passage 27. The airflow adjustment valve 28 adjusts the amount of exhaust gas supplied from the exhaust passage 22 to the intake passage 33.

A pedal depression sensor (accelerator-operation-amount sensor) 40, a crank angle detector 41, an intake air temperature detector 29, a coolant temperature detector 24, and the airflow adjustment valve 28 are electrically connected to the control computer C. The pedal depression sensor 40 detects the amount by which an accelerator pedal (not shown) has been depressed, that is, the amount by which an accelerator has been operated. Information on the depression amount detected by the pedal depression sensor 40 is transmitted to the control computer C. The control computer C determines the engine load based on the information on the detected depression amount. Information on the crank angle detected by the crank angle detector 41 is transmitted to the control computer C. The control computer C calculates the engine speed based on the information on the crank angle detected by the crank angle detector 41. The pedal depression sensor 40, the crank angle detector 41, and the control computer C form a driving state detection unit, which detects the driving state of the engine. The coolant temperature detector 24 detects the temperature of the coolant for the engine.

The control computer C controls the electric motor 371, the flow amount control valve 36, and the spark plug 18 in accordance with the determined engine load F and the calculated engine speed N. The intake air temperature detector 29 transmits information on the detected intake air temperature to the control computer C. The coolant temperature detector 24 transmits information on the detected coolant temperature to the control computer C.

Figure 1B:
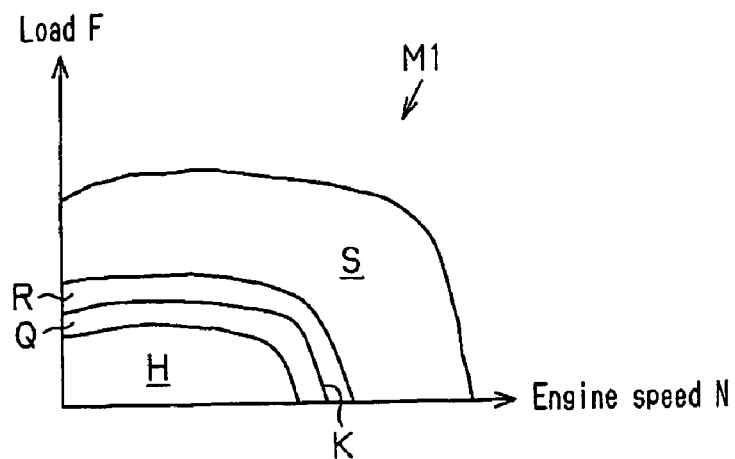
FIG. 1B is a map showing combustion ranges of the engine shown in FIG. 1A.

The control computer C stores a combustion range map M1 shown in FIG. 1B, which is defined by the engine load F and the engine speed N. The control computer C determines which one of ranges S, R, Q, and H in the combustion region map M1 the coordinates of the engine load F and the engine speed N, hereafter referred to as the driving state (F, N), are included in. The driving state (F, N) is input at every crank angle of 360 degrees. Ranges S and R are spark ignition combustion ranges in which the air-fuel mixture in the combustion chamber 112 is burned by igniting the spark plug 18, and ranges H and Q are compression ignition combustion ranges in which compression-ignited combustion can be performed. Hereinafter, spark-ignited combustion will be referred to as "SI combustion", and compression-ignited combustion will be referred to as "HCCI combustion".

Figure 2:
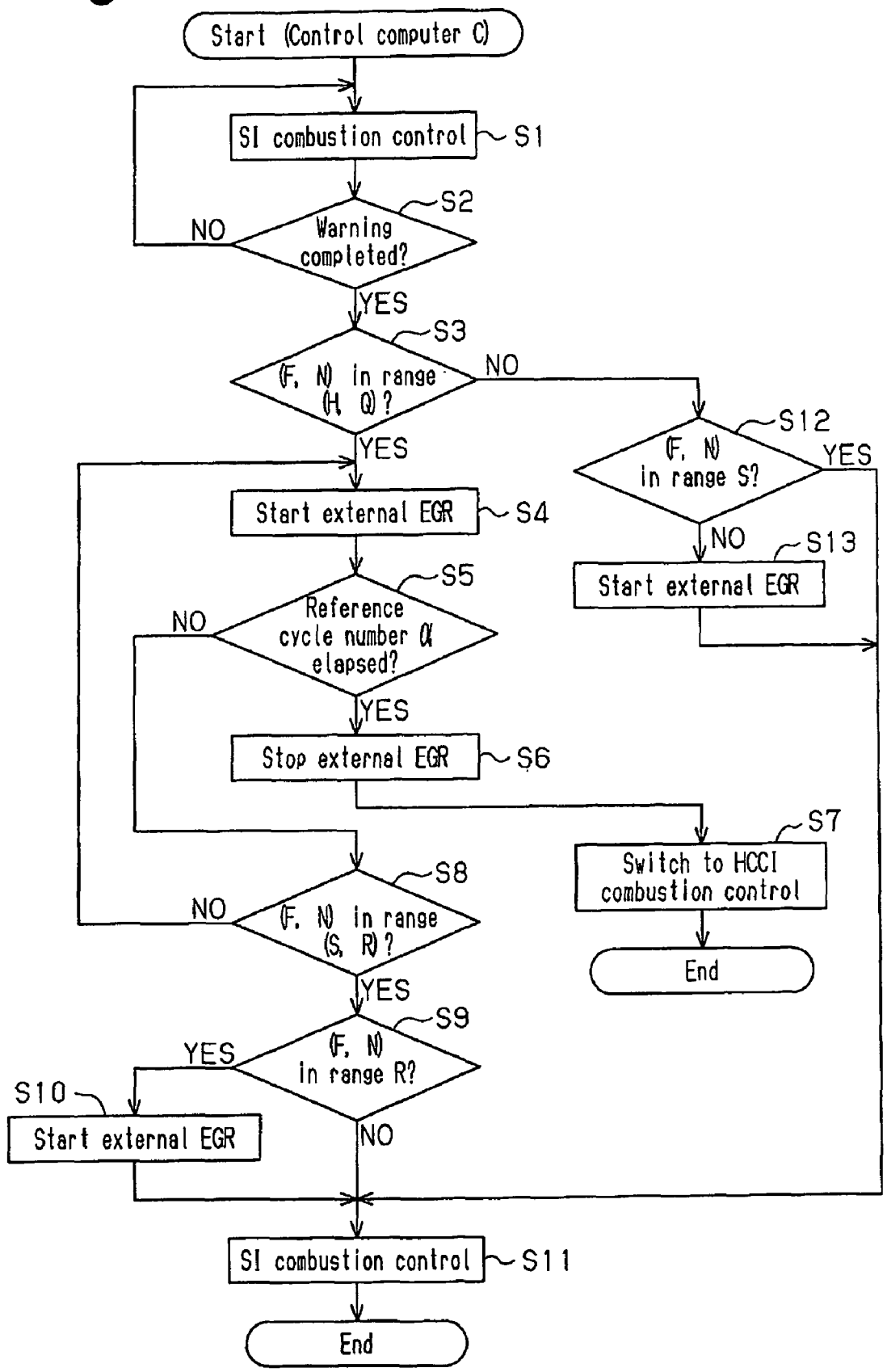
FIG. 2 is a flowchart illustrating a switch control program that is executed by a control computer shown in FIG. 1.
Figure 3:
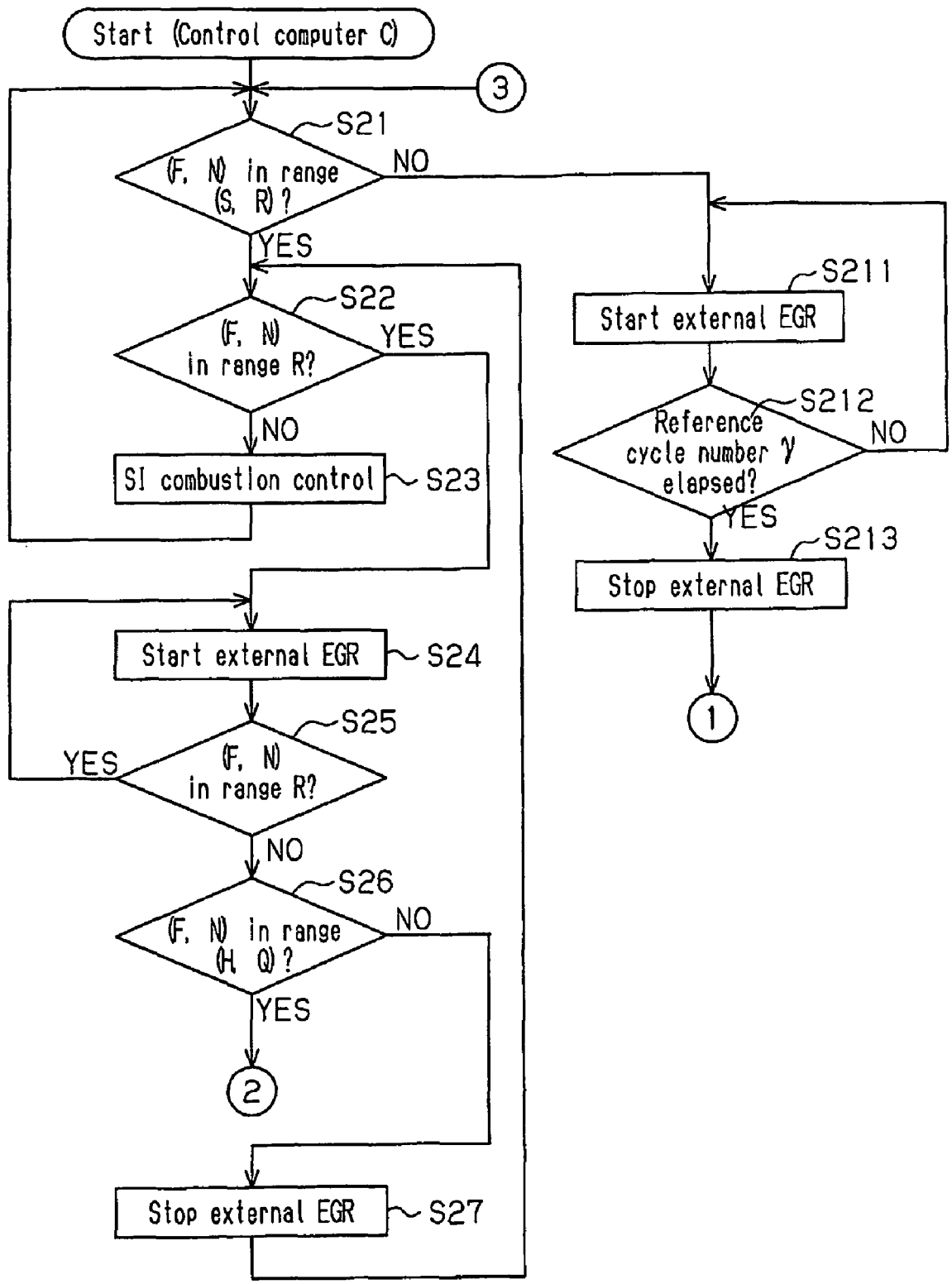
FIG. 3 is a flowchart illustrating a switch control program that is executed by the control computer shown in FIG. 1.
Figure 4:
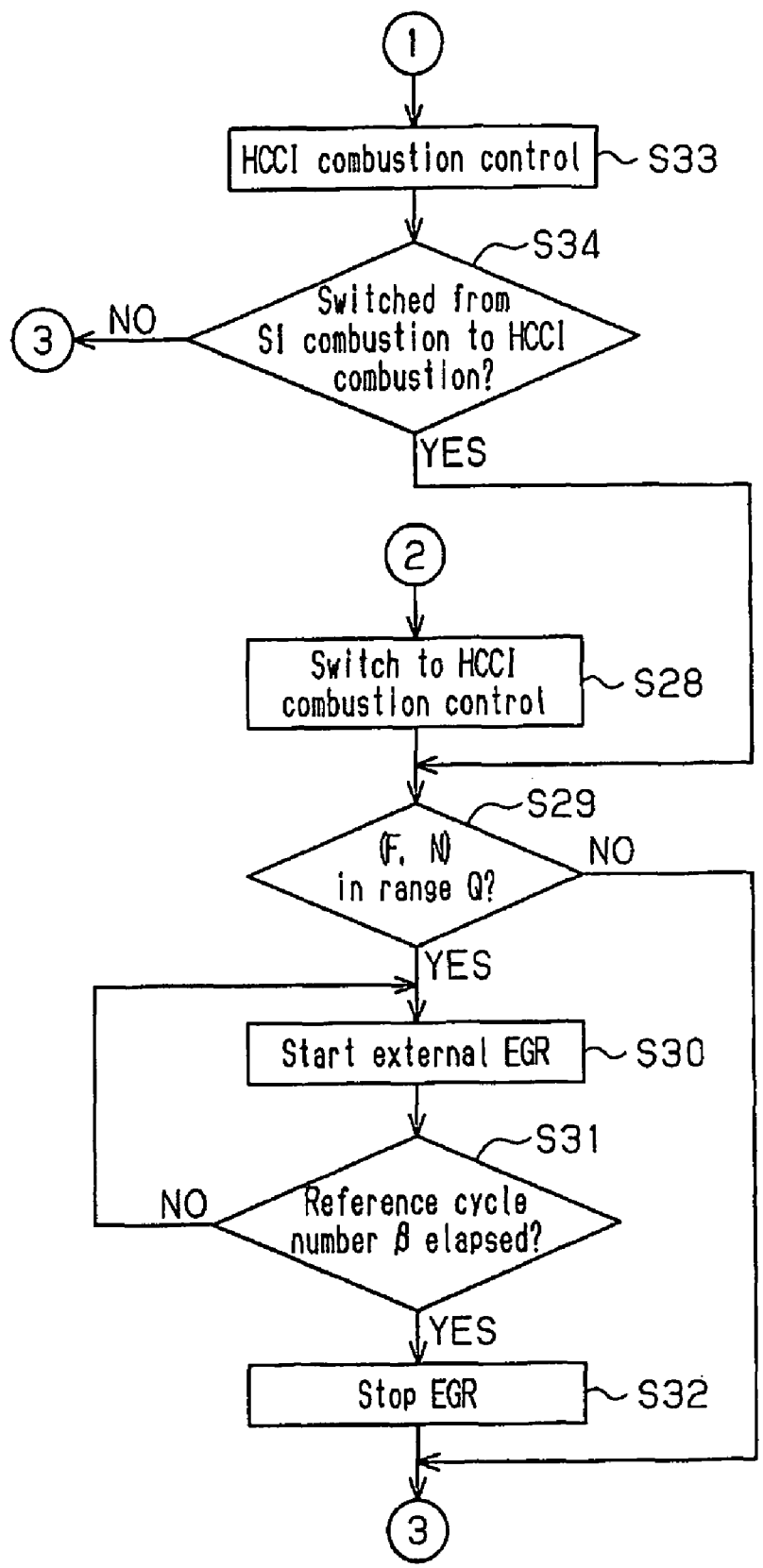
FIG. 4 is a flowchart illustrating a switch control program that is executed by the control computer shown in FIG. 1.

FIGS. 2 to 4 are flowcharts illustrating a switch control program for controlling the switching of combustion modes between SI combustion and HCCI combustion. The control computer C executes switch control based on the switch control program shown in the flowcharts of FIGS. 2 to 4 and the combustion range map M1. The switch control will now be discussed with reference to the flowcharts of FIGS. 2 to 4.

The flowchart of FIG. 2 illustrates a switch control program executed during a period from when the engine is started to immediately after the warming of the engine is completed. In step S1, the control computer C starts executing spark ignition (SI) combustion control when the engine is started. In step S2, the control computer C determines whether the warming of the engine has been completed based on the intake air temperature information obtained by the intake air temperature detector 29 and the detected coolant temperature information obtained by the coolant temperature detector 24. When determining that warming of the engine has not been completed in step S2, the control computer C continues the SI combustion control.

When the warming of the engine has been completed in step S2, the control computer C determines whether the driving state (F, N) is included in a homogeneous charge compression ignition (HCCI) combustion range (H, Q) in step S3. When the driving state (F, N) is in the HCCI combustion range (H, Q), the control computer C starts external exhaust gas recirculation (external EGR) in step S4. External EGR is a process in which some of the exhaust gas flowing through the exhaust passage 22 is supplied to the intake passage 33 by opening the airflow adjustment valve 28 and mixed with fresh air so that the mixture is drawn into the combustion chamber 112.

In step S5, the control computer C determines whether the external EGR has been performed for a period corresponding to a reference cycle number a (one revolution of the engine crankshaft corresponds to one cycle). The reference cycle number α is expressed by a map, of which the variables are the wall surface temperature of the combustion chamber 112, measured during experiments conducted when the driving state (F, N) is in a switch preparation combustion range R, and the corresponding engine speed. The temperature is expressed by a map, of which the variables are the engine speed and the engine load. That is, the reference cycle number α is determined based on a map, of which the variables are the engine speed and the engine load.

When the external EGR is performed for the period corresponding to the reference cycle number a in step S5, the control computer C stops the external EGR by closing the airflow adjustment valve 28 in step S6. The control computer C switches from the SI combustion control to the HCCI combustion control in step S7.

When the external EGR has not been performed for the period corresponding to the reference cycle number α, the control computer C determines whether the driving state (F, N) is included in a spark ignition (SI) combustion range (S, R) in step S8. When the driving state (F, N) is not in the SI combustion range (S, R), that is, when the driving state (F, N) has not shifted from the HCCI combustion range (H, Q) to the SI combustion range (S, R), the control computer C proceeds to step S4.

When the driving state (F, N) is in the SI combustion range (S, R), that is, when the driving state (F, N) has shifted from the HCCI combustion range (H, Q) to the SI combustion range (S, R), the control computer C determines whether the driving state (F, N) is included in the switch preparation combustion range R in step S9. When the driving state (F, N) is in the switch preparation combustion range R in step S9, the control computer C continues the external EGR in step S10. The control computer C then continues the SI combustion control in step S11.

When the driving state (F, N) is not in the switch preparation combustion range R in step S9, that is, when the driving state (F, N) is in a combustion range S, the control computer C continues the SI combustion control in step S1.

When the driving state (F, N) is not in the HCCI combustion range (H, Q) in step S3, the control computer C determines whether the driving state (F, N) is included in the combustion range S in step S12. When the driving state (F, N) is in the combustion range S in step S12, the control computer C proceeds to step S11.

When the driving state (F, N) is not in the combustion range S in step S12, that is, when the driving state (F, N) is in the switch preparation combustion range R, the control computer C starts the external EGR in step S13. When the driving state (F, N) is in the switch preparation combustion range R, the control computer C continues the external EGR.

The flowcharts of FIGS. 3 and 4 illustrate a switch control program used when the engine is in a normal driving state after the warming of the engine is completed.

In step S21, the control computer C determines whether the driving state (F, N) is included in the SI combustion range (S, R). When the driving state (F, N) is in the SI combustion range (S, R) in step S21, the control computer C determines whether the driving state (F, N) is included in the switch preparation combustion range R in step S22. When the driving state (F, N) is not in the switch preparation combustion range R in step S22, the control computer C executes the SI combustion control in step S23.

When the driving state (F, N) is in the switch preparation combustion range R in step S22, the control computer C starts the external EGR in step S24. During the external EGR, the control computer C determines whether the driving state (F, N) is included in the switch preparation combustion range R in step S25. When the driving state (F, N) is in the switch preparation combustion range R in step S25, the control computer C continues the external EGR.

When the driving state (F, N) is not in the switch preparation combustion range R in step S25, the control computer C determines whether the driving state (F, N) is included in the HCCI combustion range (H, Q) in step S26. When the driving state (F, N) is not in the HCCI combustion range (H, Q) in step S26, that is, when the driving state (F, N) has shifted from the switch preparation combustion range R to the combustion range S, the control computer C stops the external EGR in step S27. After processing step S27, the control computer C proceeds to step S22.

When the driving state (F, N) is in the HCCI combustion range (H, Q) in step S26, that is, when the driving state (F, N) has shifted from the switch preparation combustion range R to the HCCI combustion range (H, Q), the control computer C switches from the SI combustion control to the HCCI combustion control in step S28. When the driving state (F, N) is in the combustion range Q in step S29, the control computer C starts the external EGR in step S30. In step S31, the control computer C determines whether the external EGR has been performed for a period corresponding to a reference cycle number β (one revolution of the engine crankshaft corresponds to one cycle). The reference cycle number β is expressed by a map, of which the variables are the wall surface temperature of the combustion chamber 112, measured during experiments conducted when the driving state (F, N) is in a temporary EGR combustion range Q, and the corresponding engine speed. The temperature is expressed by a map, of which the variables are the engine speed and the engine load. That is, the reference cycle number β is determined based on a map, of which the variables are the engine speed and the engine load.

When the external EGR has been performed for the period corresponding to the reference cycle number P in step S31, the control computer C stops the external EGR in step S32. In other words, when the driving state (F, N) shifts from the SI combustion range (S, R) to the combustion range Q, the control computer C temporarily performs the external EGR for the period corresponding to the reference cycle number β. Subsequently, the control computer C proceeds to step S21. The combustion range Q is hereafter referred to as the "temporary EGR combustion range Q".

When the driving state (F, N) is not in the temporary EGR combustion range Q in step S29, the control computer C proceeds to step S21.

When the driving state (F, N) is not in the SI combustion range in step S21, the control computer C starts the external EGR in step S211.

Subsequently, in step S212, the control computer C determines whether the external EGR has been performed for a period corresponding to a reference cycle number γ (one revolution of the engine crankshaft corresponds to one cycle). The reference cycle number γ may be equal to α or β as long as it is set to an integer that is greater than or equal to 0.

When the external EGR has been performed for the period corresponding to the reference cycle number γ in step S212, the control computer C stops the external EGR by closing the airflow adjustment valve 28 in step S213. The control computer C then executes the HCCI combustion control in step S33. In step S34, the control computer C determines whether the HCCI combustion control in step S33 had been shifted from SI combustion control. When the HCCI combustion control in step S33 had been shifted from HCCI combustion control, the control computer C proceeds to step S29. When the HCCI combustion control in step S33 had not been shifted from the SI combustion control, the control computer C proceeds to step S21.

The external EGR performed in steps S4, S10, S13, S24, and S30 draws cooled exhaust gas into the combustion chamber 112 and lowers the wall surface temperature of the combustion chamber 112.

The control computer C functions as a control unit that specifies either one of the HCCI combustion range and the SI combustion range based on the engine driving state detected by the driving state detection unit and the combustion range map M1, which is used to specify the combustion range in accordance with the driving state, and executes the combustion control corresponding to the specified combustion range.

The supply passage 27 and the airflow adjustment valve 28 form an external EGR apparatus 30, which supplies the intake passage 33 with some of the exhaust gas discharged to the exhaust passage and mixes the exhaust gas with fresh air in the intake passage 33.

The switch preparation combustion range R is included in the SI combustion range (S, R) and extends along a boundary K between the SI combustion range (S, R) and the HCCI combustion range (H, Q). The control computer C executes control to perform the external EGR, which lowers the temperature in the combustion chamber 112, in a state in which the driving state (F, N) is in the switch preparation combustion range R (in a state in which the switch preparation combustion range is specified).

The temporary EGR combustion range Q is included in the HCCI combustion range (H, Q) and extends along the boundary K. When the driving state (F, N) shifts from the SI combustion range (S, R) to the HCCI combustion range (H, Q), if the driving state (F, N) shifts to the temporary EGR combustion range Q (when the temporary EGR combustion range Q is specified, the control computer C temporarily executes control to perform the external EGR so as to lower the temperature in the combustion chamber 112.

The first embodiment has the advantages described below.

(1) When the driving state (F, N) is in the switch preparation combustion range R, which is a part of the SI combustion range (S, R), the combustion chamber 112 undergoes external EGR. The exhaust gas supplied from the exhaust passage 22 to the intake passage 33 through the supply passage 27 is cooled as it flows through the exhaust passage 22, the supply passage 27, and the intake passage 33. Thus, cooled exhaust gas is drawn into the combustion chamber 112. When switching from the SI combustion range (S, R) to the HCCI combustion range (H, Q) (switching from SI combustion to HCCI combustion), the temperature in the combustion chamber 112 (the wall surface temperature of the combustion chamber) is lowered beforehand so that when HCCI combustion is started, the temperature in the combustion chamber 112 (the wall surface temperature of the combustion chamber) is already low. This enables the engine to shift to HCCI combustion in an optimum manner when switching from SI combustion to HCCI combustion and thereby prevents overly advanced ignition and engine knocking.

(2) When the driving state (F, N) is in the HCCI combustion range (H, Q) immediately after the warming of the engine is completed, the combustion mode of the engine is switched from SI combustion to HCCI combustion. The external EGR is performed when switching combustion modes from SI combustion to HCCI combustion. This enables the engine to shift to HCCI combustion in an optimum manner when switching from SI combustion to HCCI combustion and thereby prevents the overly advanced ignition and engine knocking.

(3) If the driving state (F, N) is the same, the opening degree of the throttle is greater during HCCI combustion than during SI combustion. If the driving state (F, N) is the same and the air-fuel ratio is the same, the engine needs the same amount of air. Thus, when the external EGR is performed, the throttle opening degree must be increased to compensate for the amount of air that becomes insufficient. In the present embodiment, the external EGR is started before the combustion mode is switched from SI combustion to HCCI combustion. Thus, the control computer C executes control to increase the throttle opening degree before the combustion mode is switched from SI combustion to HCCI combustion. As a result, the throttle opening becomes close to the required degree before the combustion mode is switched from SI combustion to HCCI combustion. This reduces torque differences.

A second embodiment according to the present invention will now be described with reference to FIGS. 5 to 7. To avoid redundancy, like or same reference numerals are given to those components that are the same as the corresponding components of the first embodiment.

Figure 5A:
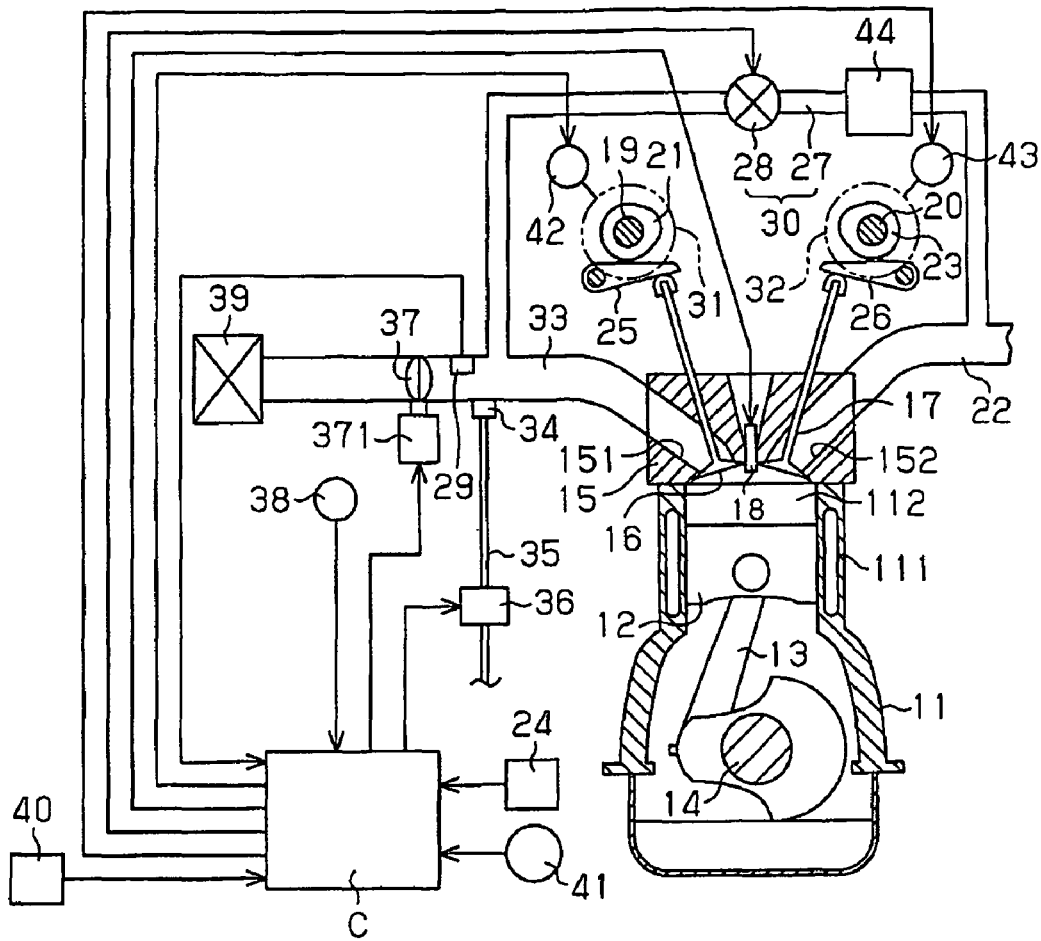
FIG. 5A is a schematic diagram showing the structure of a second embodiment of an HCCI engine according to the present invention.

As shown in FIG. 5A, a hydraulic intake variable valve timing mechanism 31 known in the art (hereafter referred to as an intake VVT 31) is arranged at a basal portion of the intake camshaft 19. A hydraulic exhaust variable valve timing mechanism 32 (hereafter referred to as exhaust VVT 32), which is known in the art, is arranged at a basal portion of the exhaust camshaft 20. The intake VVT 31 transmits rotational drive force of the crankshaft 14 to the intake camshaft 19. The intake VVT 31 also changes the rotational phase of the intake camshaft 19 relative to the crankshaft 14 with hydraulic pressure. The exhaust VVT 32 transmits rotational drive force of the crankshaft 14 to the exhaust camshaft 20. The exhaust VVT 32 also changes the rotational phase of the exhaust camshaft 20 relative to the crankshaft 14 with hydraulic pressure.

A hydraulic pressure supply adjustment mechanism 42 is connected to the intake VVT 31 by a hydraulic pressure passage. A hydraulic pressure supply adjustment mechanism 43 is connected to the exhaust VVT 32 by a hydraulic pressure passage. The hydraulic pressure supply adjustment mechanism 42 controls the operation of the intake VVT 31, which adjusts the rotational phase of the intake camshaft 19. The hydraulic pressure supply adjustment mechanism 43 controls the operation of the exhaust VVT 32, which adjusts the rotational phase of the exhaust camshaft 20. The control computer C controls the hydraulic pressure supply adjustment mechanisms 42 and 43.

Figure 5B:
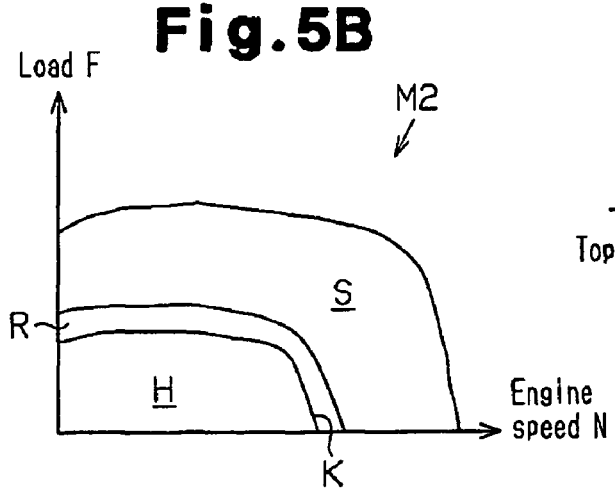
FIG. 5B is a map showing combustion ranges of the engine shown in FIG. 5A.
Figure 5C:
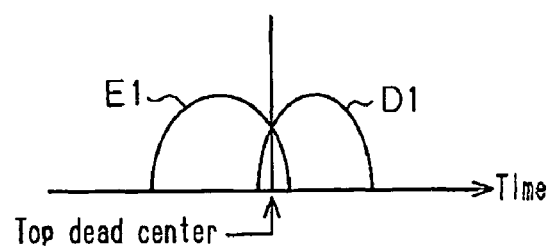
FIG. 5C is a timing chart showing the opening and closing timings of exhaust valves and intake valves when the engine shown in FIG. 5A performs SI combustion.
Figure 5D:
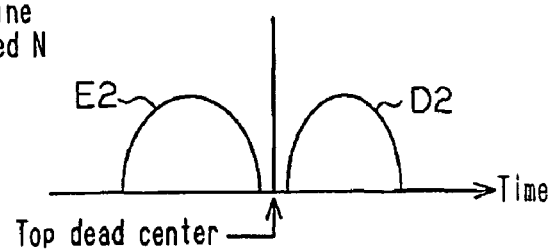
FIG. 5D is a timing chart showing the opening and closing timings of exhaust valves and intake valves when the engine shown in FIG. 5A performs HCCI combustion.

Referring to FIG. 5C, during spark-ignition combustion, the exhaust valve 17 is driven to open and close at timings indicated by curve E1, and the intake valve 16 is driven to open and close at timings indicated by curve D1. Referring to FIG. 5D, during compression-ignition combustion, the exhaust valve 17 is driven to open and close at timings indicated by curve E2, and the intake valve 16 is driven to open and close at timings indicated by curve D2. That is, when the engine performs HCCI combustion, some of the burned gas in the combustion chamber 112 remains in the combustion chamber 112. Hereafter, the "internal EGR" refers to the process of enclosing some of the burned gas in the combustion chamber 112 by closing the exhaust valve during, for example, the exhaust stroke to mix the remaining burned gas in the combustion chamber 112 with fresh air that is supplied into the combustion chamber 112 in the next combustion cycle. The internal EGR is performed during HCCI combustion to assist HCCI combustion using the heat of the burned exhaust gas remaining in the combustion chamber 112. The temperature of the burned gas used in the internal EGR is higher than the temperature of the exhaust gas used in the external EGR.

In FIGS. 5C and 5D, the positions of the curves E1 and E2 with respect to the direction in the horizontal axis are determined by controlling the adjustment state of the exhaust VVT 32. Further, the positions of the curves D1 and D2 with respect to the direction of the horizontal axis are determined by controlling the adjustment state of the intake VVT 31. The amount of burned gas remaining in the combustion chamber 112 increases as the curve E2 shifts to the left along the horizontal axis. The amount of burned gas remaining in the combustion chamber 112 decreases as the curve E2 shifts to the right along the horizontal axis. Hereinafter, the phrase of "reducing the internal EGR amount" means that the curve E2 is moved to the right along the horizontal axis to reduce the amount of burned gas remaining in the combustion chamber 112.

An EGR cooler 44 is arranged in the supply passage 27. The EGR cooler 44 cools the exhaust gas flowing through the supply passage 27.

The control computer C stores a combustion range map M2 for the driving state (F, N) as shown in FIG. 5B. The combustion range map M2 differs from the combustion range map M1 only in that the combustion range map M2 does not include the temporary EGR combustion range Q. The range (S, R) is a spark ignition (SI) combustion range. The range H is a homogeneous charge compression ignition (HCCI) combustion range, in which HCCI combustion can be performed.

Figure 6:
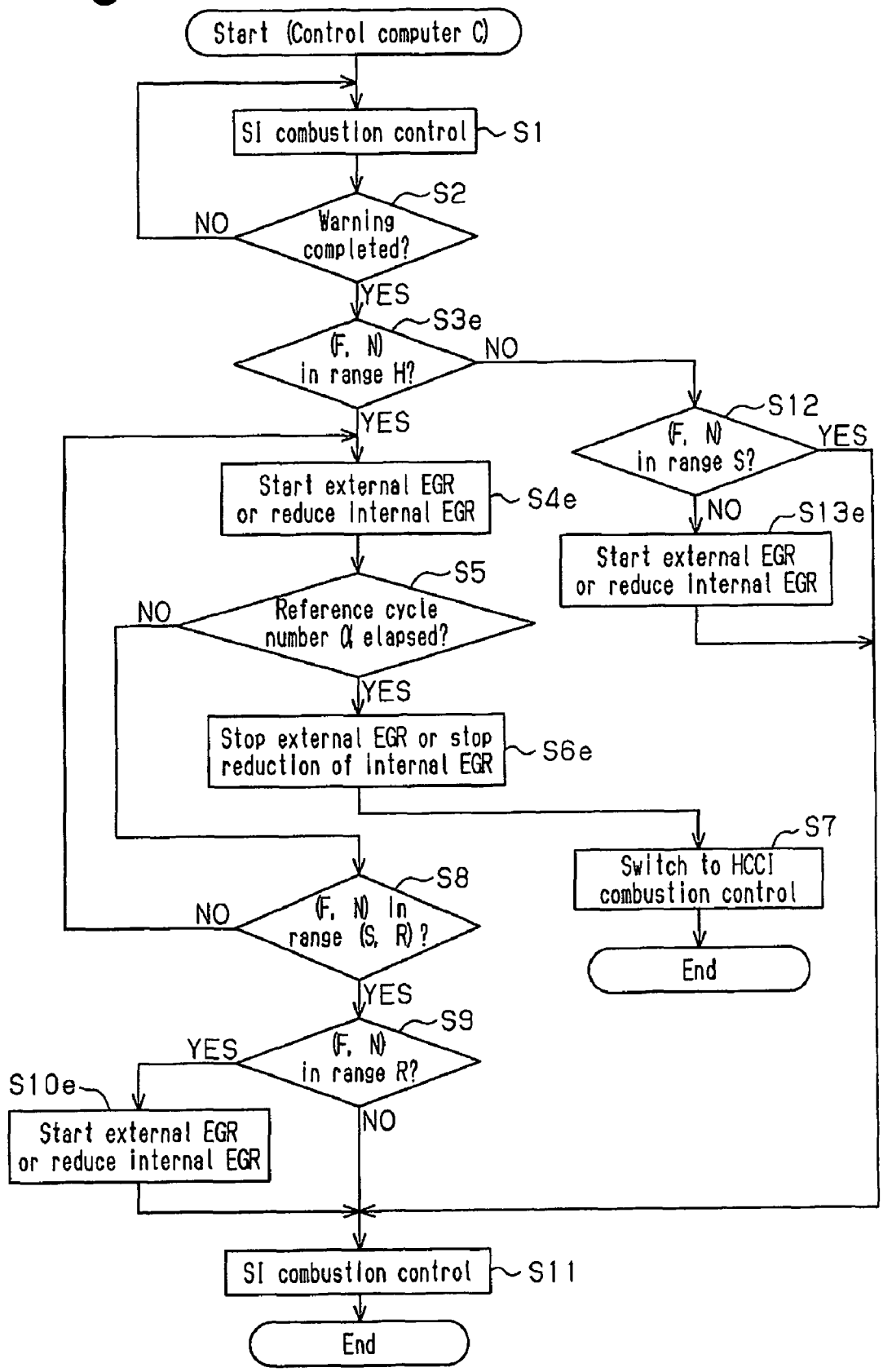
FIG. 6 is a flowchart illustrating a switch control program that is executed by a control computer shown in FIG. 5A.
Figure 7:
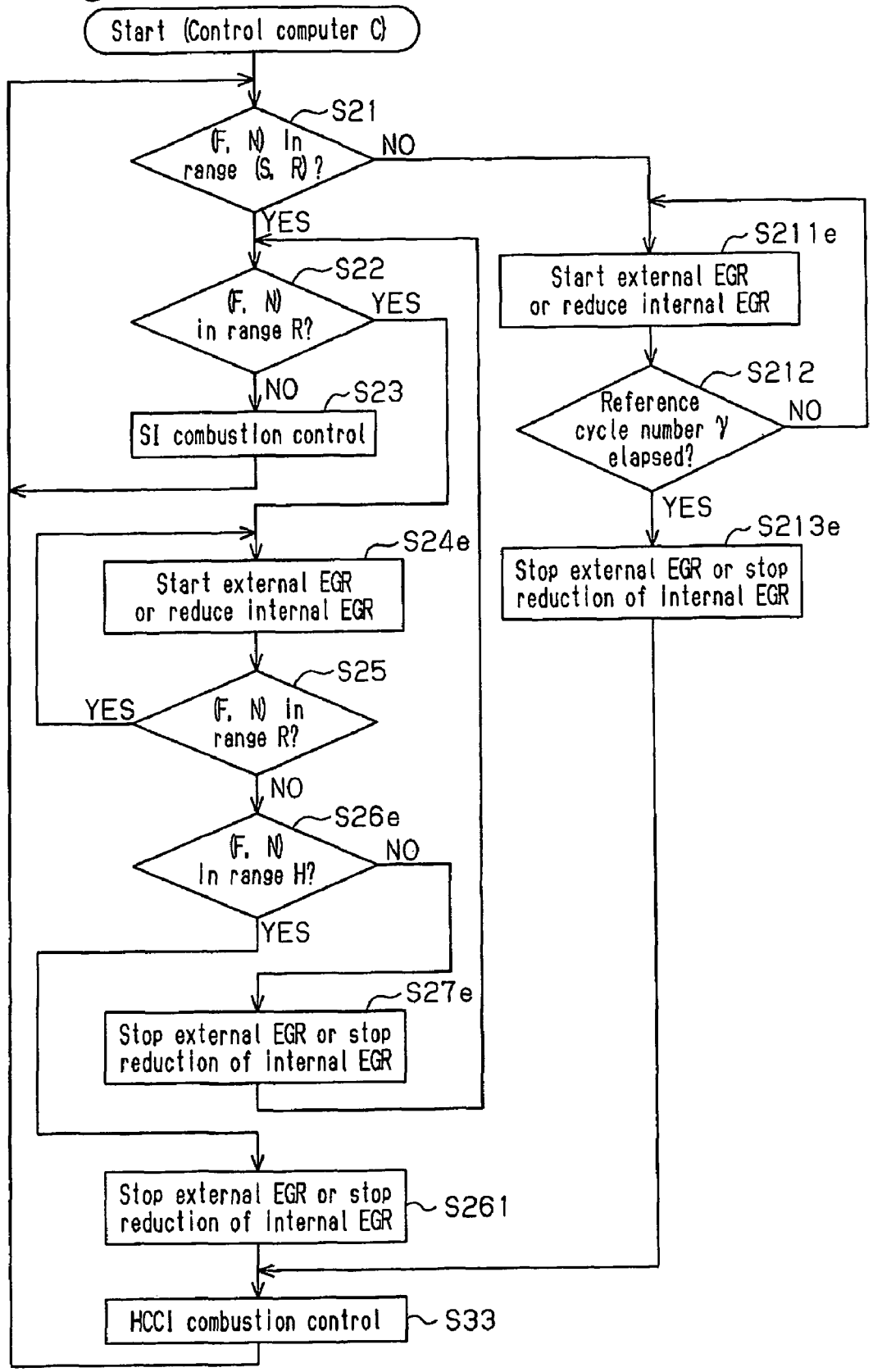
FIG. 7 is a flowchart illustrating a switch control program that is executed by the control computer shown in FIG. 5A.

The control computer C executes switching control based on the switch control program illustrated in the flowcharts of FIGS. 6 and 7 and the combustion range map M2. The flowchart of FIG. 6 corresponds to the flowchart of FIG. 2 in the first embodiment. The flowchart of FIG. 7 corresponds to the flowcharts of FIGS. 3 and 4 in the first embodiment.

The switching control will now be described based on the flowcharts shown in FIGS. 6 and 7. Steps in the flowcharts that are identical to steps included in the flowcharts of the first embodiment will not be described. Only steps that are not included in the flowcharts of the first embodiment will be described.

The combustion range map M2 does not include the temporary EGR combustion range Q, which is included in the combustion range map M1. Thus, in step S3e of FIG. 6, the control computer C determines whether the driving state (F, N) is included in the HCCI combustion range H.

When the internal EGR is performed, the control computer C starts the external EGR or reduces the internal EGR amount in steps S4e, S10e, and S13e of FIG. 6. Then, the control computer C stops the external EGR or stops reducing the internal EGR amount in step S6e of FIG. 6.

The control computer C determines whether the driving state (F, N) is included in the HCCI combustion range H in step S26e of FIG. 7. When the internal EGR is performed, the control computer C starts the external EGR or reduces the internal EGR amount in steps S24e and S211e of FIG. 7. Further, the control computer C stops the external EGR or stops reducing the internal EGR amount in steps S27e, S213e, and S261 of FIG. 7.

The external EGR in steps S4e, S10e, S13e, S24e, and S211e draws cooled exhaust gas into the combustion chamber 112 and lowers the wall surface temperature of the combustion chamber 112. Reduction in the internal EGR amount in steps S4e, S10e, S13e, S24e, and S211e lowers the wall surface temperature of the combustion chamber 112.

The second embodiment has the advantages described below in addition to advantages (1) and (2) of the first embodiment.

(4) When switching from SI combustion to HCCI combustion, the temperature in the combustion chamber 112 may also be lowered by reducing the residual amount of the internal EGR.

(5) The exhaust gas used in the external EGR is cooled by the EGR cooler 44. Thus, the temperature in the combustion chamber 112 can be lowered during the external EGR with a small amount of exhaust gas.

It should be apparent to those skilled in the art that the present invention may be embodied in many other specific forms without departing from the spirit or scope of the invention. Particularly, it should be understood that the present invention may be embodied in the following forms.

In the first embodiment, the process of determining whether the driving state (F, N) is included in the combustion range (H, Q, R) may be performed in lieu of step S3 in the flowchart of FIG. 2. In this case, when the driving state (F, N) is in the combustion range R, the external EGR may be performed during a period corresponding to the reference cycle number α and the external EGR may then be temporarily suspended. Subsequently, the external EGR is resumed if the driving state (F, N) is still in the combustion range R after suspension of the external EGR.

In the first embodiment, if the driving state (F, N) shifts from the switch preparation combustion range R to the combustion range S when the period corresponding to the reference cycle number a has not yet elapsed from when the driving state (F, N) shifts to the switch preparation combustion range R, the external EGR may be stopped after the external EGR is performed over the period corresponding to the reference cycle number α.

In the first embodiment, the EGR cooler 44 may be arranged in the supply passage 27.

Instead of performing both internal and external EGR, only internal EGR may be performed. In this case, the internal EGR amount may be reduced when the driving state (F, N) is in the switch preparation combustion range R.

When the ranges in which the external EGR is performed to reduce NOx in the combustion range maps M1 and M2 overlap the switch preparation combustion range R, the external EGR amount may be increased in the overlapping ranges by setting the opening degree of the airflow adjustment valve 28 to be greater than the opening degree corresponding to the external EGR amount that is assumed to reduce NOx.

The wall surface temperature of the combustion chamber 112 may be measured when the engine is being driven, and the measured wall surface temperature may be used to determine the reference cycle numbers α, β, and γ while the engine is being driven.

The external EGR may be started or the internal EGR amount may be reduced as required even when the driving state (F, N) is in the HCCI combustion range H.

The external EGR may be started or the internal EGR amount may be reduced as required even when the driving state (F, N) is switched from the HCCI combustion range (H, Q) to the SI combustion range (S, R) due to certain factors such as changes in the load.

The present examples and embodiments are to be considered as illustrative and not restrictive, and the invention is not to be limited to the details given herein, but may be modified within the scope and equivalence of the appended claims.

The invention claimed is:

1. A homogeneous charge compression ignition engine operated in combustion modes switchable between homogenous charge compression ignition combustion and spark ignition combustion, the engine comprising:

a combustion chamber;

an intake passage through which flows fresh air that is drawn into the combustion chamber;

an exhaust passage through which flow exhaust gas that is discharged from the combustion chamber;

an external exhaust gas recirculation apparatus which performs external exhaust gas recirculation by supplying the intake passage with some of the exhaust gas discharged to the exhaust passage and mixing the exhaust gas supplied to the intake passage with fresh air;

a driving state detection unit which detects a driving state of the engine; and a control unit which executes combustion control by specifying either one of a homogeneous charge compression ignition combustion range and a spark ignition combustion range based on the driving state of the engine detected by the driving state detection unit and a combustion range map for specifying the combustion range that is in accordance with the driving state;

wherein the combustion range map includes the homogenous charge compression ignition combustion range, the spark ignition combustion range, and a switch preparation combustion range that is included in the spark ignition combustion range and extended along a boundary between the spark ignition range and the homogeneous charge compression ignition combustion range;

the control unit lowers the temperature in the combustion chamber when the switch preparation combustion range is specified by executing a control for reducing the amount of internal exhaust gas recirculation or having the external exhaust gas recirculation apparatus perform the external exhaust gas recirculation;

reducing the amount of the internal exhaust gas recirculation or performing external exhaust gas recirculation is continuously performed when the switch preparation combustion range is specified; and the homogeneous charge compression ignition combustion is continuously performed until the spark ignition combustion range except for the switch preparation combustion range is specified once the homogeneous charge compression ignition is performed.

2. The engine according to claim 1, wherein:

the combustion range map includes a temporary exhaust gas recirculation combustion range included in the homogeneous charge compression ignition combustion range and extending along the boundary; and the control unit lowers the temperature in the combustion chamber if the temporary exhaust gas recirculation combustion range is specified when the combustion mode is switched from the spark ignition combustion to the homogeneous charge compression ignition combustion by executing a control for reducing the internal exhaust gas recirculation amount or having the external exhaust gas recirculation apparatus temporarily perform the external exhaust gas recirculation.

3. The engine according to claim 1, wherein the internal exhaust gas recirculation or external exhaust gas recirculation is stopped when a range other than the switch preparation combustion range is specified before a period corresponding to a reference cycle number a elapses after the switch preparation combustion range is specified.

4. The engine according to claim 1, wherein the external exhaust gas recirculation apparatus includes:

a supply passage which supplies exhaust gas from the exhaust passage to the intake passage; and a cooler arranged on the supply passage.

5. The engine according to claim 1, further comprising:

an intake valve which selectively connects and disconnects the intake passage and the combustion chamber;

an exhaust valve which selectively connects and disconnects the exhaust passage and the combustion chamber; and a variable valve timing mechanism which varies opening and closing timings of at least one of the intake valve and the exhaust valve;

wherein the control unit controls the variable valve timing mechanism to adjust the internal exhaust gas recirculation.

6. The engine according to claim 1, wherein reducing the amount of the internal exhaust gas recirculation or performing external exhaust gas recirculation is stopped before the spark ignition combustion is switched to the homogenous charge compression ignition combustion.

7. The engine according to claim 1, wherein the homogeneous charge compression ignition combustion range includes a temporary external exhaust gas recirculation combustion range that is extended along the boundary between the spark ignition range and the homogeneous charge compression ignition combustion range; and the control unit temporarily executes control to perform the external exhaust gas recirculation when the temporary external exhaust gas recirculation combustion range is specified after the spark ignition combustion is switched to the homogeneous charge compression ignition combustion.

* * * * *